United States Patent [19]
Hellmeier et al.

[11] Patent Number: 6,082,256
[45] Date of Patent: Jul. 4, 2000

[54] APPARATUS AND METHOD OF DECORATING ARTICLES USING A TRANSPORT SCREW WITH A VARYING SCREW FLIGHT PITCH

[75] Inventors: Joachim Hellmeier, Rödinghausen; Volker Steffen, Herford, both of Germany

[73] Assignee: Werner Kammann Maschinenfabrik GmbH, Bünde, Germany

[21] Appl. No.: 09/153,400

[22] Filed: Sep. 15, 1998

[30] Foreign Application Priority Data

Oct. 14, 1997 [DE] Germany .................. 197 45 313

[51] Int. Cl.⁷ .................................. B65G 33/02
[52] U.S. Cl. .................. 101/35; 101/44; 198/867.14; 198/867.15; 198/792
[58] Field of Search .................. 101/35, 36, 37, 101/38.1, 39, 40, 43, 44; 198/465.1, 867.01, 867.14, 867.15, 792, 334, 465.2, 467.1

[56] References Cited

U.S. PATENT DOCUMENTS

| Re. 24,961 | 4/1961 | Curtis ........................ 118/316 |
| 3,232,414 | 2/1966 | Brigham et al. ............ 198/725 |
| 4,509,429 | 4/1985 | De Broqueville ........... 104/25 |
| 5,097,935 | 3/1992 | Weiss ........................ 198/345.3 |
| 5,520,107 | 5/1996 | Airoldi ....................... 101/35 |
| 5,542,768 | 8/1996 | Rother et al. ............... 400/120.16 |

FOREIGN PATENT DOCUMENTS

| 0 089 543 | 3/1983 | European Pat. Off. . |
| 32 24 330 | 1/1984 | Germany . |
| 89 13 408 U | 12/1989 | Germany . |
| 5-318700 | 12/1993 | Japan . |
| 1032546 | 6/1966 | United Kingdom . |

*Primary Examiner*—John S. Hilten
*Assistant Examiner*—Daniel J. Colilla
*Attorney, Agent, or Firm*—Seidel, Gonda, Lavorgna & Monaco, PC

[57] ABSTRACT

In an apparatus and method of decorating articles which are transported on article carriers through a treatment station along a transport path which is linear at least over a portion of its extent, the article carriers are transported through the linear portion of the transport path by a screw having a screw flight adapted to engage with a respective article carrier required to move along the linear portion of the transport path. Rotation of the screw advances the respective article carrier along the linear transport path portion. The screw preferably rotates at a constant speed so that changes in the speed of movement of the article carrier along the linear portion of the transport path are implemented by variations in the screw flight pitch over the length of the screw.

37 Claims, 5 Drawing Sheets

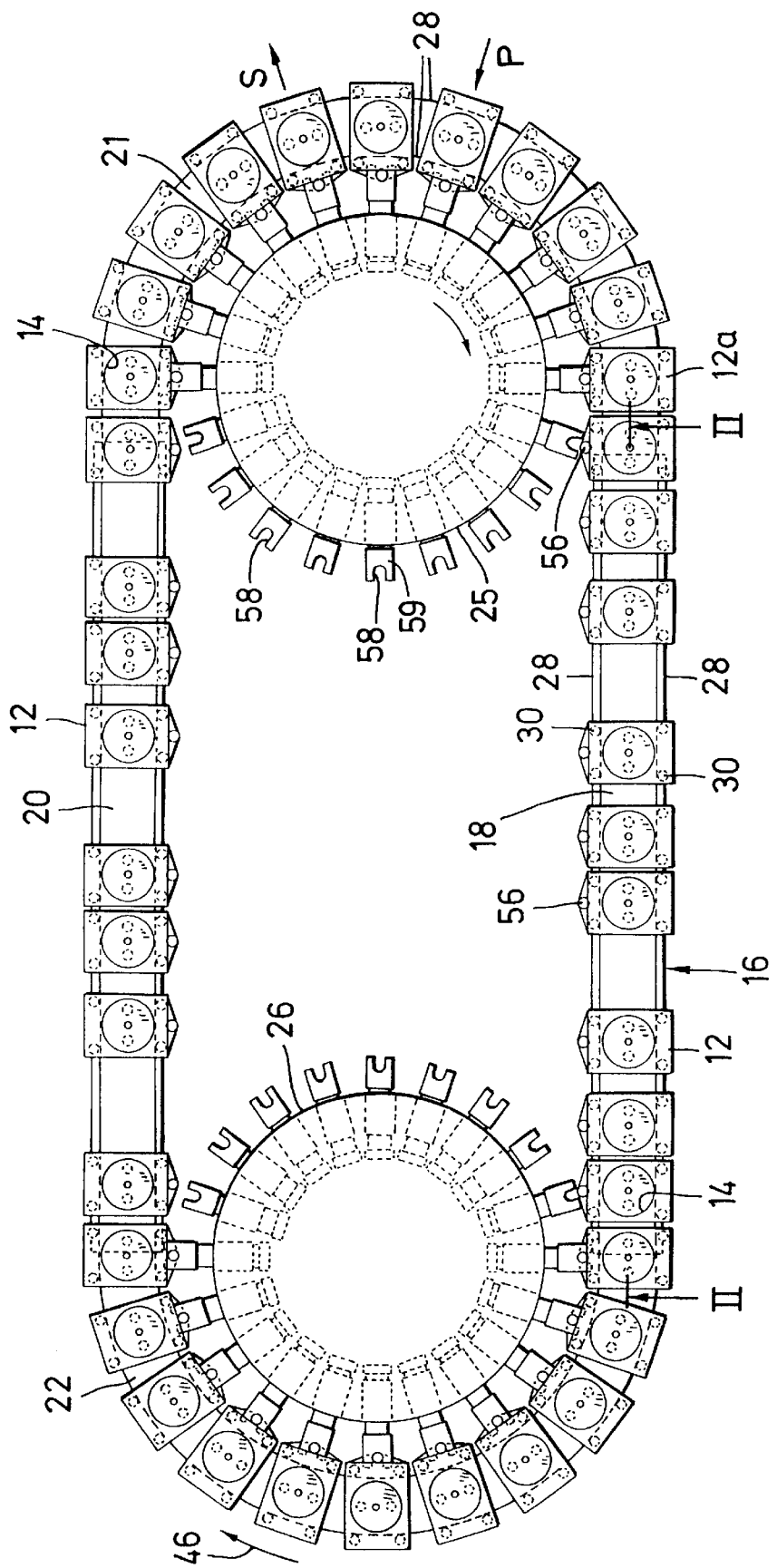

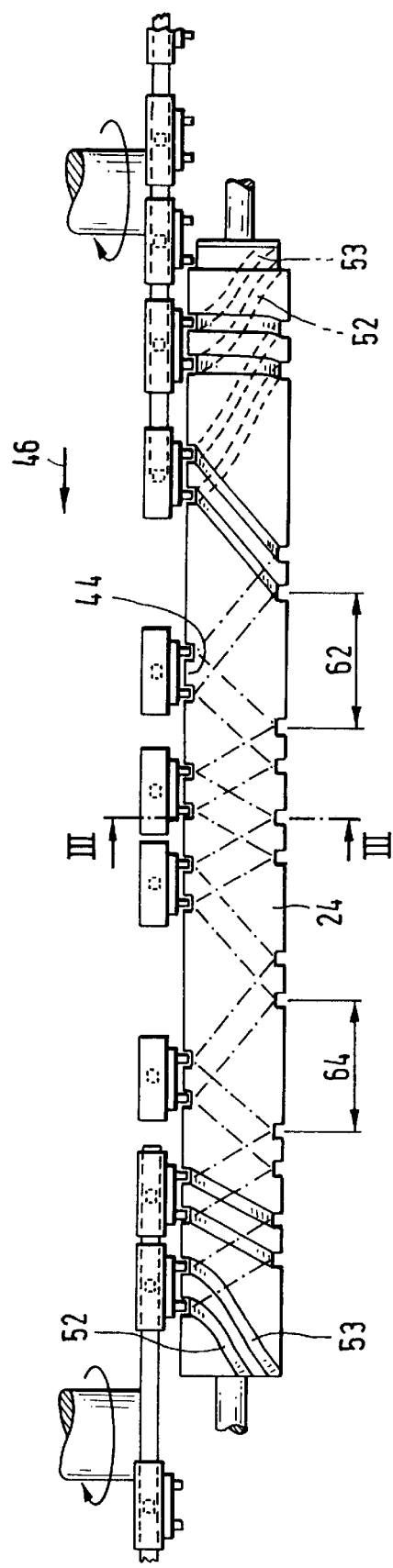

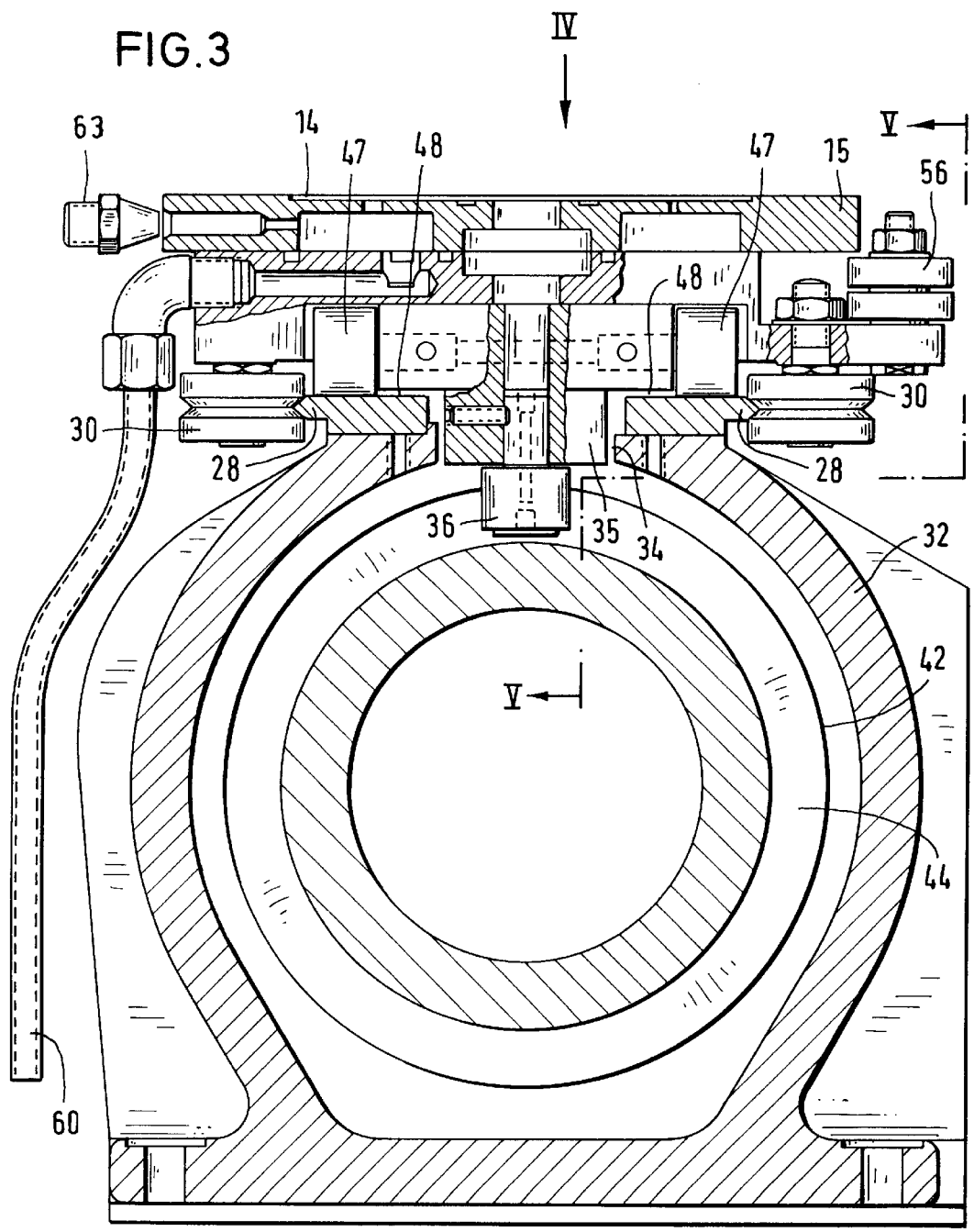

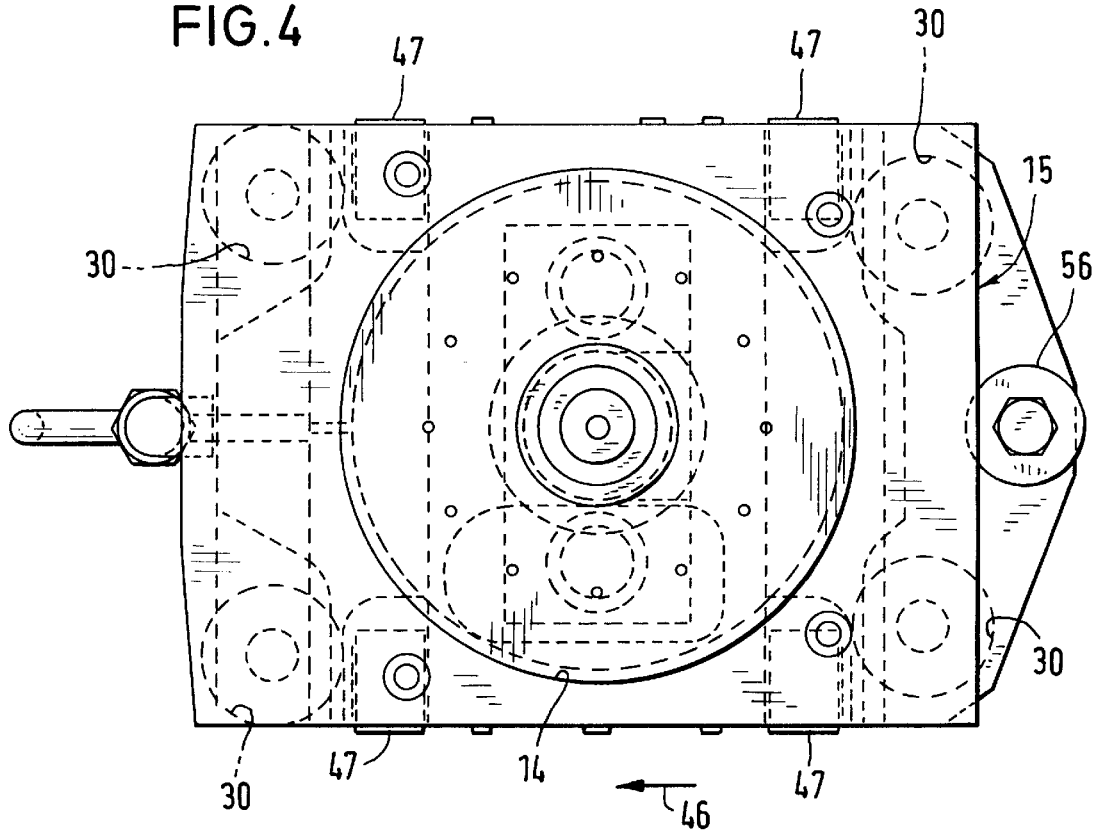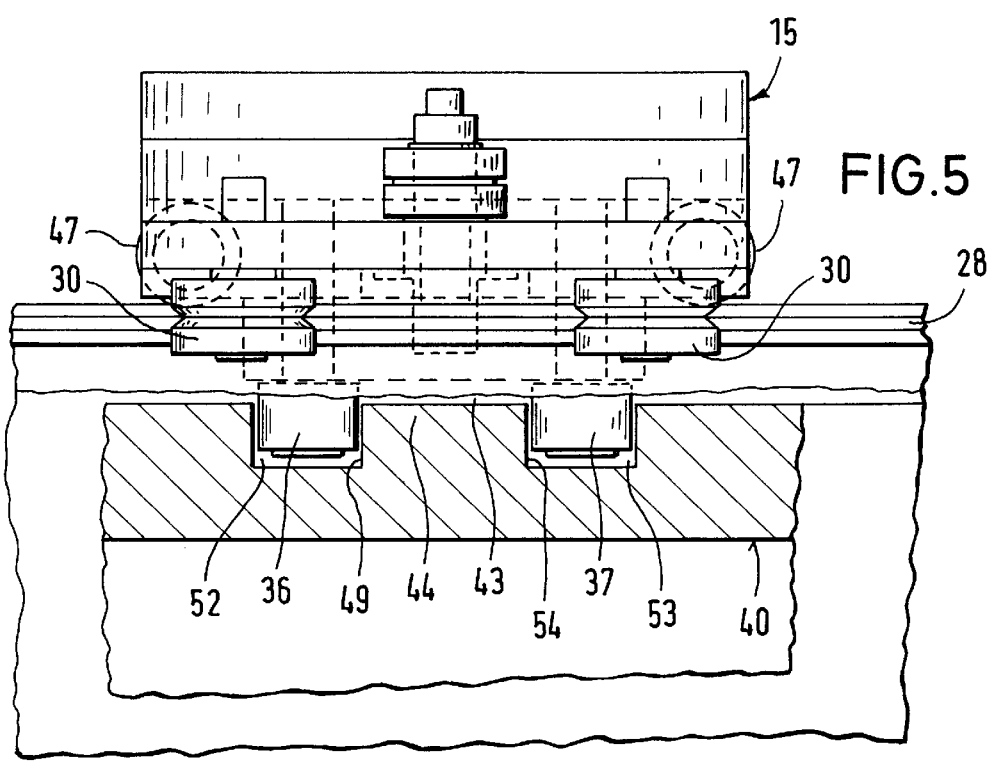

APPARATUS AND METHOD OF DECORATING ARTICLES USING A TRANSPORT SCREW WITH A VARYING SCREW FLIGHT PITCH

FIELD OF THE INVENTION

The invention concerns an apparatus for and a method of decorating articles which are transported through a treatment station along a transport path which is linear at least over a part of its extent.

BACKGROUND OF THE INVENTION

When decorating articles using for example a printing process which entails successively applying to the article a plurality of individual print images which together combine on the article to form the overall print image which is generally multi-colored, there is the risk that the inks or colors of two or more individual print images mingle together, even if only slightly, so that the resulting overall print image gives an impression which does not correspond to that which was intended. That danger arises in particular when printing on surfaces which are very smooth so that they do not have an absorption effect for the printing ink, as occurs for example when printing on paper. CDs, telephone cards and the like may be mentioned here as examples of articles of that kind to which printing is to be applied.

A prerequisite for the production of a good-quality overall print image which involves different colors is that the article to which the printing is to be applied and the printing mechanisms for applying the partial print images that together make up the overall print image can be precisely oriented and positioned relative to each other. The degree of accuracy which is required for that purpose when transporting the articles into the respective printing station and also during the printing operation in which the article must be moved for example in accordance with the peripheral speed of the impression cylinder of the printing mechanism cannot be achieved with the transport wheels or tables which are usually employed nowadays and which generally rotate in a stepwise fashion, with the treatment stations, that is to say also the printing station, being arranged at the periphery thereof. That is essentially to be attributed to the fact that a certain amount of play in the drive and in the mounting assemblies of such transport tables or wheels cannot ever be entirely avoided. On the other hand those transport tables or wheels also suffer from the disadvantage that the diameter thereof increases with an increasing number of treatment stations to be arranged around the periphery thereof, so that they can no longer be transported or they can be transported only with some considerable difficulty.

SUMMARY OF THE INVENTION

An object of the present invention is to provide an apparatus for decorating articles which is so designed as to at least substantially obviate the shortcomings of the above-discussed apparatuses.

Another object of the present invention is to provide an apparatus for decorating articles which can afford more precise orientation of the articles with respect to a printing mechanism for applying the decoration, using simple means.

Yet another object of the present invention is to provide an apparatus for applying decoration such as printing to articles, which can provide for precise application of the printing and in which the same means can be employed for transporting and orienting or moving the article relative to a respective printing assembly.

Still a further object of the present invention is to provide an article-decorating apparatus which permits the articles during transportation thereof to be moved at different speeds which can be adapted to the requirements involved in the respective treatment stations of the assembly.

Yet a further object of the present invention is to provide a method of decorating articles which can be carried into effect by simple reliable apparatus structure while affording quality decoration results.

In accordance with the principles of the present invention the foregoing and other objects are achieved in the apparatus aspect by an apparatus for decorating articles which are transported through a treatment station along a transport path which is linear at least over a portion of its extent, comprising a transport means in the form of at least one screw associated with the at least one linear transport path portion. The screw has at least one screw flight engaged with a carrier movable along the transport path for the article to be decorated, in order thereby to advance the article carrier along said transport path portion by means of rotation of the screw.

In the method aspect of the present invention in accordance with the principles thereof the foregoing and other objects are attained by a method of decorating articles which are transported along a transport path which is linear at least along a portion of its extent, through at least one treatment station, wherein each article is carried by a respective article carrier. The drive for the article carriers is effected by at least one transport screw operatively associated with a linear portion of the article transport path, at least one screw flight of the screw being operatively associated with the article carrier in such a way that the rotating screw transports the article carrier along the transport path.

As will be apparent from the description hereinafter of preferred embodiments of the apparatus and method according to the invention, the connection which is preferably such as to involve positively locking engagement as between the screw and the respective article carrier provides that, in the regions in which the screw flight does not extend perpendicularly to the longitudinal axis of the screw but is set at an angle, the article carrier is moved along the transport path parallel to the longitudinal axis of the screw, as the screw rotates. On the condition that the articles to be printed assume a defined position within the respective article carrier, precise orientation of the article with respect to a respective treatment station, that is to say for example a printing station, can be guaranteed by way of the pitch angle of the screw flight and the speed of rotation of the screw.

A further advantage involved in using a transport screw in this way is that variations in the pitch of the screw flight, over the length of the screw, make it possible to alter the speed at which the article carrier is moved along the transport path, even when the screw is rotating at a constant speed of rotation without the need for additional control or regulating measures. In the case of stationarily arranged printing mechanisms having a rotating impression cylinder, in the region of the printing mechanism the screw flight can be of such a configuration that the article is passed through the printing mechanism at a constant speed which corresponds to the peripheral speed of the peripheral surface of the impression cylinder carrying the print image which is to be transferred on to the article to be decorated by printing thereon. On the other hand, in the region of the drying stations, the article carriers can be caused to move along the transport path at a slower speed in order to achieve the desired satisfactory drying effect. A slower speed may also be necessary for example in a station in which the articles are identified.

The engagement between the screw flight on the transport screw and the respective article carrier can advantageously also be achieved by the screw flight operatively co-operating with at least one entrainment member such as a roller which is disposed on the article carrier, in such a way that there is positively locking engagement between the screw flight and the article carrier. In order to be able to achieve precise orientation of the article carrier with respect to the screw and thus with respect to the respective treatment station, under all circumstances, it is desirable to provide two entrainment rollers or the like, between which there is a space into which the screw flight engages. The fact that, as the screw and therewith the screw flight rotates, the rollers roll against the screw flight, means that the tolerance between the two rollers and the screw flight can be extremely slight, at least if necessary, in order to achieve a high level of precision in this part of the assembly and thus in the operating procedure involved. In order to achieve a defined positively locking engagement between the screw flight and the article carrier, for example at the two entrainment rollers referred to above, irrespective of the pitch angle of the screw flight, it is desirable for the screw flight to be of varying widths in dependence on its pitch, in such a way that at any event, that is to say in particular with any pitch angle, it is possible to achieve the positively locking connection between the screw flight and the article carrier, which as mentioned above involves the minimum possible tolerance.

More specifically in a preferred feature the apparatus can be such that the transport path for the article carriers has first and second guides of a V-shaped cross-section, which are disposed at a substantially horizontal spacing from each other and each of which co-operates with at least one guide roller mounted on the article carrier, the guide roller having a peripheral surface of a correspondingly V-shaped cross-section.

So that those guides do not need to carry high vertical forces which can act on the article and thus also on the article carrier at least in the printing stations, in a preferred feature of the invention each article carrier is provided with additional support rollers which are supported on a support surface. In many cases the support surface only needs to be provided in the printing station.

Further objects, features and advantages of the invention will be apparent from the following description of preferred embodiments.

BRIEF DESCRIPTION OF THE DRAWING

FIG. 1 is a diagrammatic plan view of an apparatus according to the invention for decorating articles in the form of CDs, FIG. 2 is a view of a portion of the transport path of the FIG. 1 apparatus looking approximately in the direction of the arrows II—II in FIG. 1, but with the housing of the transport screw omitted, FIG. 3 is a view in section taken along line III—III in FIG. 2, FIG. 4 is a plan view looking approximately in the direction of the arrow IV in FIG. 3, FIG. 5 is a side view, partly in section, looking approximately in the direction of the arrows V—V in FIG. 3.

DESCRIPTION OF PREFERRED EMBODIMENTS

Figure 6:
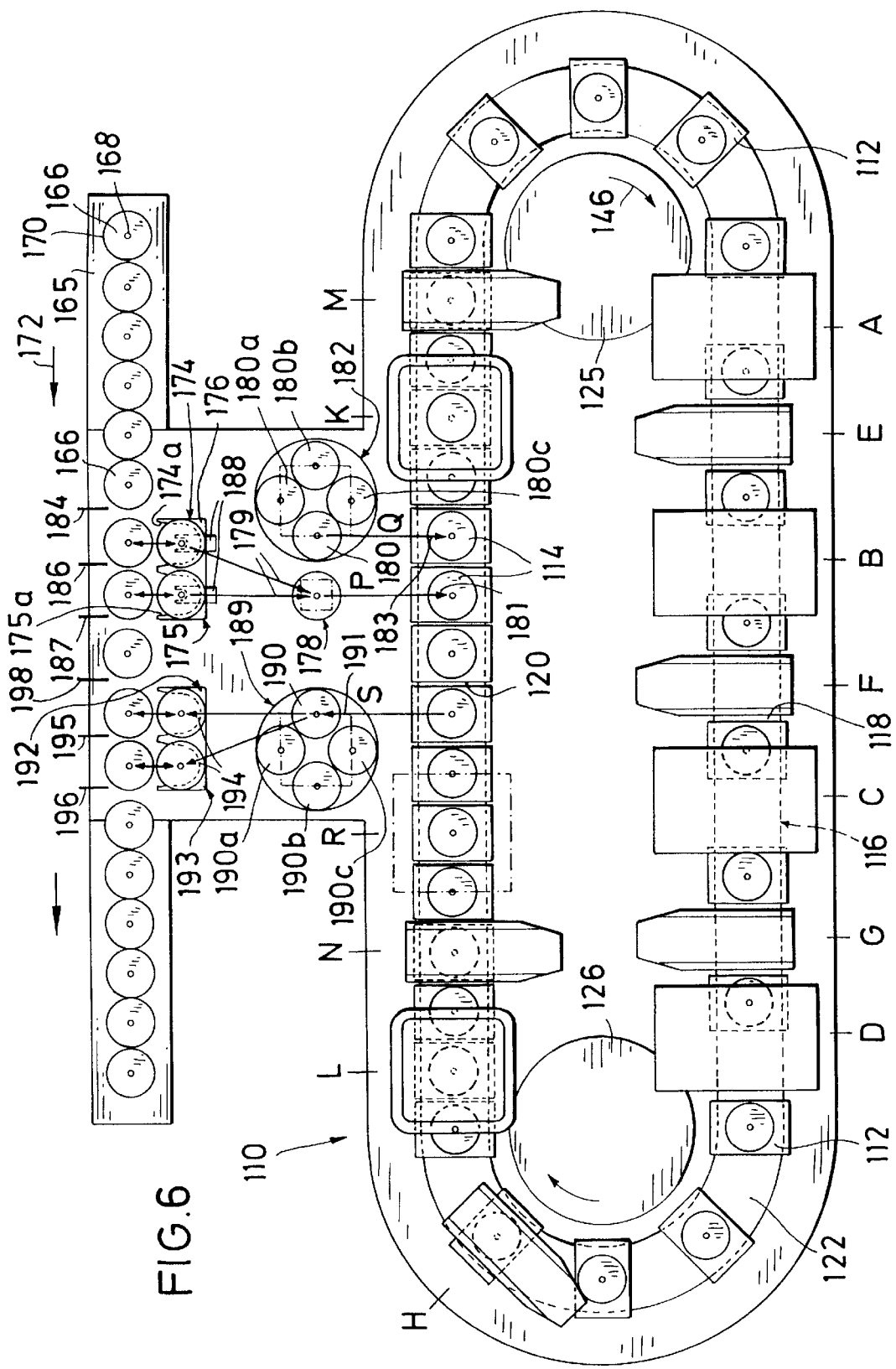
FIG. 6 is a diagrammatic plan view of a second embodiment with treatment stations.

Referring firstly to FIG. 1, reference numeral 10 therein generally denotes an apparatus in the form of a printing machine for decorating articles in the form of CDs by applying printing thereto. The apparatus 10 has a plurality of article carriers 12 which are each in the form of a respective carriage and which are each provided on their top side with a respective holder seen at 15 for example in FIGS. 3 and 5 which has a receiving means indicated at 14 for example also in FIG. 1 for the CD to be printed upon. The article carriers 12 are successively moved along a transport path indicated at 16 in FIG. 1, which has first and second linear portions 18 and 20 disposed at a horizontal spacing from each other, and first and second approximately semicircular portions 21 and 22 which respectively interconnect the linear portions 18, 20. Associated with each of the linear portions 18, 20 of the transport path 16 is a transport screw indicated at 24 in FIG. 2, which causes transportation of the article carriers 12 in the direction indicated by the arrow 46 in FIG. 2, in each of the linear portions 18 and 20 of the transport path 16. Associated with each of the two arcuate portions 21, 22 of the transport path 16 is a respective transport wheel 25 and 26 which rotates in a horizontal plane and which, in the embodiment illustrated in FIGS. 1 through 5, rotates continuously.

Referring now also to FIGS. 3 and 5, provided in the region of each of the two linear portions 18, 20 of the transport path 16 are first and second guide rails 28 which are disposed at a horizontal spacing from each other and which are of a V-shaped cross-section as can be clearly seen from FIG. 3. Mounted on the article carrier 12 at the underside thereof are respective guide rollers 30 which, at their peripheral surface, have a peripherally extending groove of V-shaped cross-sectional configuration, which is adapted to the cross-sectional shape of the respective guide rails 28 and 29 with which the rollers cooperate. It will be seen therefore that the guide rollers 30 are arranged in pairs in such a way that a respective pair of guide rollers 30 co-operates with one of the two guide rails 28 at respective sides of the transport path 16.

The portions of the guide rails 28 which respectively extend between the arcuate portions 21 and 22 respectively of the transport path 16 and thus between the transport wheels 25 and 26 are each carried by a housing indicated at 32 in FIG. 3, which accommodates the transport screw 24 associated with the respective portion 18, 20 of the transport path 16. At its top side, in the region between the two guide rails 28, the housing 32 has an opening 34 extending over the entire length of the transport screw 24. In the region of the transport wheels 25, 26 the guide rails 28 are supported by a holding arrangement (not shown).

At its underside each article carrier 12 is provided with a projection 35 on which are mounted first and second entrainment rollers of which one is shown at 36 in FIG. 3 and of which two can be seen at 36 and 37 in FIG. 5. The entrainment rollers 36, 37 are each rotatable about a respective vertical axis and engage into grooves indicated at 52 and 53 in FIGS. 2 and 5, in the transport screw 24. The grooves 52, 53 extend in substantially parallel, spaced-apart relationship around the screw 24, to define a screw flight indicated at 44 in for example FIG. 2. FIG. 5 in particular shows that the screw flight defined by the grooves 52, 53 in the transport screw 24 engages into the region indicated at 43 in FIG. 5 between the two entrainment rollers 36, 37 and thus engages behind the entrainment roller 36 which is the leading roller in the direction of transportation movement as indicated by the arrow 46, with the consequence that, in the longitudinal portions of the transport screw 24 in which the screw flight 44 does not have a portion extending precisely perpendicularly to the longitudinal axis of the screw 24, a rotary movement of the screw 24 about its longitudinal axis produces displacement of the respective article carrier 12 along the respective linear portion 18 or 20 of the transport path 16. It will be clearly seen from FIG. 2 that the pitch angle of the screw flight 44 in the transport screw 24 is varied along the length thereof.

By virtue of suitable dimensioning of the space between the two entrainment rollers 36, 37 and the width of the screw flight 44 it is thus possible to achieve a level of accuracy in the movement of the article carrier, which goes far beyond the level of accuracy of known machines for decorating articles. In addition, at least the entrainment roller 36 which is the leading roller in the transportation direction 46 can be of a slightly cambered or crowned configuration in such a way that its diameter is somewhat larger in the central region as viewed in the axial direction of the roller and this therefore guarantees a precisely defined, peripherally extending contact region, in particular between the leading entrainment roller 36 and the flank or side surface as indicated at 49 in FIG. 5 of the screw flight 44. The crown or camber shape of the entrainment rollers 36 and/or 37 is so slight that it is not especially shown or visible in the drawing.

The relationship which is shown in the drawing, in particular FIG. 5, as between the entrainment rollers 36, 37 on the illustrated article carrier 12 on the one hand and the surfaces of the screw flight 44 on the other hand represents positive guidance for the article carrier 12 such that, with a suitable design configuration in respect of the transport screw 24, there is the possibility of the article carrier 12 being positioned with a degree of accuracy which it was not possible hitherto to achieve, while the article carrier can be moved at a certain speed relative for example to a printing station. As highly precise guidance and positioning of the article is not required in all treatment stations, it may be desirable for the screw flight 44 to be of such a configuration that, in stations in which a high degree of precision in regard to positioning and transportation movement of the article is required, the entrainment roller 36 which leads in the transport direction 46 bears against the flank or side surface 49 of the groove 52, which is the trailing flank or side surface in the transport direction 46, while the trailing entrainment roller 37 bears against the flank or side surface 54 of the trailing groove 53, being the flank or side surface which leads in the transport direction 46, so that the article carrier is precisely oriented relative to the screw and the screw flight 44, in the transport direction 46 and in the opposite direction thereto. On the other hand, in regions of the apparatus in which there is no need for such a high degree of accuracy of positioning and movement, for example in the drying stations of the apparatus, it will generally be sufficient for only the entrainment roller 36 which is the leading roller in the transport direction 46 to bear against the side surface of the screw flight 44. The trailing entrainment roller 37 does not need to bear against a side surface of the groove 54 which accommodates it. Thus, here there is a certain amount of play or clearance which will contribute to reducing the amount of wear of the transport screw 24. Those differing conditions in terms of operative engagement between the entrainment rollers 36 and 37 respectively and the groove respectively associated therewith can be achieved by the width of the screw flight 44 suitably varying over the length of the screw.

Furthermore, and looking still at FIGS. 3 through 5, in the region between the two pairs of guide rollers 30 in the transverse direction as shown in FIG. 3, the article carrier 12 illustrated is provided with two pairs of support rollers indicated at 47. The rollers 47 are each rotatable about a substantially horizontal axis. The support rollers 47 run on support surfaces indicated at 48 in FIG. 3, which are formed by the upper boundary surface of the respective guide rail 28, and their function is in particular to carry the forces which in the printing operation are applied by the impression cylinder to the article being printed upon and thus to the article carrier 12, so that such forces do not act on the guide rollers 30. In the embodiment illustrated in FIGS. 1 through 5 the guide rails 28 are carried by the screw housing 32 which can readily be of such a design configuration and dimensioning that it carries without noticeable deformation the vertical forces which take effect when carrying out a printing operation, using for example an offset cylinder. As forces of that kind do not occur in other treatment stations, for example in a screen printing station or in a drying station, it is sufficient for the support surfaces 48 to be provided only in the region of those treatment stations at which the expectation is for vertical forces which cannot be satisfactorily carried by the guide rails 28. Consequently the support surfaces 48 do not need to be provided in the region of the arcuate portions 21, 22 of the transport path 16 if no treatment stations, in particular for example offset printing stations, at which such high vertical forces are expected to occur, are present in those arcuate portions 21, 22. On the other hand it is advantageous for the guide rails 28 to be arranged to extend over the entire length of the transport path 16, that is to say also in the arcuate portions 21, 22 thereof.

Reference will now be made to FIG. 4 showing that, in projection, the support rollers 47 are arranged outside the receiving means 14 provided on the article carrier 12 for accommodating the respective CD to be printed upon, so that vertical pressure forces applied to the CD disposed in the receiving means 14, to provide for the application of printing thereto, do not result in the generation of a torque acting on the article carrier 12.

With reference now to FIG. 3, at its side which is the inner side with respect to the transport path 16 which extends in a closed loop through the apparatus, each article carrier 12 is provided with an upper entrainment roller 36 which is rotatable about a vertical axis on a suitable spindle (shown but not referenced in FIG. 3) and by way of which the respective article carrier is entrained in the arcuate portions 21, 22 of the transport path 16. For that purpose the two transport wheels 25, 26 are provided with radial recesses indicated at 58 in FIG. 1, which are arranged in a regularly distributed array over their respective periphery and the dimensions of which, in plan view as shown in FIG. 1, match the cross-sectional shape of the entrainment rollers 56 on the article carriers 12. In the illustrated embodiment the radial recesses 58 are carried by entrainment members 59 which project radially outwardly with respect to the actual transport wheel and which are arranged at uniform spacings around the periphery of the respective transport wheel 25, 26. In a departure from the illustrated structure, it is also possible for the radial recesses 58 to be provided directly on the transport wheel, that is to say the radial recesses 58 can be in the form of recesses or openings at the peripheral portion of the respective transport wheel.

The treatment stations which are not shown in FIG. 1 for reasons of clarity of the drawing are arranged along the transport path 16, more specifically desirably in such a way that the treatment stations which require a particular degree of precision in terms of orientation of the article with respect to the treatment station, for example a printing mechanism, are associated with the linear portions 18, 20 in which transport of the respective articles can be effected with a high degree of precision by means of the respective transport screw 24, whereas those treatment stations which do not require a high level of precision and which in particular also do not result in the article and therewith the article carrier 12 carrying same being subjected to the loading of heavy forces can be at least partially associated with the arcuate portions 21 and 22 of the transport path. These may involve for example a screen printing station, and stations for checking the identity of the articles and for checking the quality of the respective print image.

Thus the articles to be printed in the station P which is associated with the transport wheel 25 and therewith the arcuate portion 21 of the transport path 16 can be introduced into the article carrier 12 which is respectively positioned there. In the course of the continuous transportation movement by virtue of the transport wheel 25, it is possible firstly to apply a primer coat to the article, for example using a screen printing procedure. No additional support for the article carrier 12 is required for that purpose as in that operation of applying primer no substantial vertical forces take effect on the article carrier 12 and thus the support action afforded by the guide rails 28 is sufficient in this phase of operation. Upon continuous rotary movement of the transport wheel, it would be necessary in that respect for the screen printing mechanism to be moved during the printing operation synchronously with the transport wheel and the article carried thereby.

In the course of the further rotary movement the article carrier passes into the position which is adopted by the article carrier indicated at 12*a* in FIG. 1 and in which it is disposed approximately at the lower apex of the transport wheel 25, with reference to the plane of the drawing in FIG. 1. At that location the arcuate portion 21 of the transport path 16 goes into a linear portion 18. The linear portion 18 forms a tangent to the circle described by the transport wheel 25, at that apex point. In terms of guidance of the article carrier 12 on the guide rails 28, this does not represent a particular consideration since, as already mentioned, the guide rails 28 extend continuously over the entire transport path 16. The only aspect which involves a change here is a change in the manner of driving the article carriers as here the article carrier 12*a* is now taken over for driving thereof by the transport screw 24 which is operatively associated with the linear portion 18 of the transport path 16. It will be appreciated that for that purpose, at the moment of the transfer from the drive by the transport wheel 25 to the drive by the transport screw 24, the peripheral speed of the transport wheel 25 in the region of the respective entrainment recess 58 must be approximately coincident with the linear speed which is applied to the article carrier 12*a* by the transport screw 24. In this phase of operation the two entrainment rollers 36, 37 of the respective article carrier pass into the region of the screw flight 44 and the article carrier 12 is thus entrained thereby in the course of the rotary movement of the screw 24. FIG. 1 shows that, in the course of further rotary movement of the transport wheel 25, the entrainment member 59 with its recess 58 comes out of engagement with the top entrainment roller 56, without particular measures being required to bring that about.

In the course of the transport movement which is then effected by the transport screw 24 associated with the linear portion 18 of the transport path 16, the article can be subjected to further treatment operations, for example in two successive offset printing stations. In each such station, an individual print image is appropriately applied to the article. In that respect, for the purposes of further improving the quality of printing, it may be desirable to provide a drying station downstream of each offset printing station in the transport direction 46 so that each individual print image applied to the article is subjected to drying before the respectively following print image is also applied thereto. That drying effect is implemented at least to such an extent that mixing and mingling of the printing agent or ink which is respectively applied in the following printing station, with the printing agent or ink which has already been applied in the previous printing station, is no longer possible. It will be noted however that in that context drying of the individual print images does not need to be taken to such an extent that the ink becomes totally hard and brittle. On the contrary, it is desirable for the drying procedure to be implemented only to such an extent that on the one hand there is no possibility of the inks of two successive individual print images becoming mingled with each other, while on the other hand it is still possible for two layers of ink or ink dots which are disposed one upon the other to be suitably joined and bonded together on the article.

The speed at which the article carrier 12 is transported along the linear portion 18 is dependent on the pitch angle of the screw flight 44. Reference will be made to FIG. 2 showing that the screw flight 44 of the transport screw 24 is of different pitches over the lengthwise extent of the screw 24 so that for example in the regions 62 and 64 in which the screw flight 44 is of the same respective pitch, a printing operation can be effected by means of offset printing, in which the constant speed at which the respective article carrier 12 is advanced by the screw 24 depends on the peripheral speed of the impression cylinder of the respective printing mechanism. In the respective stations which follow in the transport direction 46 and in which the pitch angle of the screw flight 44 is so selected that the article carrier is transported at a slower speed, a respective drying apparatus can then be provided there. It will be appreciated that it is also possible to carry out a treatment on the article, while the article carrier carrying that article is stationary. As already mentioned, for that purpose it is only necessary for a portion of the screw flight 44 not to have an inclined pitch angle, in other words the screw flight 44 is at a right angle to the longitudinal direction of the screw 24, in that portion of the screw.

At the end of the screw 24 associated with the transport wheel 26, that is to say at the downstream end of the linear portion 18 of the transport path 16, the article carrier is transferred in terms of transportation thereof from the screw 24 to the transport wheel 26, by a procedure which is the reverse to that described above in regard to transfer of the article carrier 12 from the transport wheel 25 to the beginning of the linear portion 18. When the end of the screw 24 is reached, the pitch angle of the screw flight 44 at that location is to be so selected that the linear speed of the article carrier 12 corresponds to the peripheral speed of the entrainment recesses 58 on the transport wheel 26. The top entrainment roller 56 on the article carrier passes into the recess 58 in the associated entrainment member or arm 59, which then advances the article carrier. The lower entrainment rollers thereof, at the moment of transfer of the article carrier, come out of engagement with the screw flight 44 of the screw 24, at the same time.

Once again it is possible to associate with the arcuate portion 22 of the transport path 16, given treatment stations which do not require the articles to be subjected to a high level of vertical pressure loading.

As noted above, reference 20 denotes the second linear portion of the transport path 16, the portion 20 also having a transport screw as described above. In that case for example two offset printing stations with respective drying stations arranged downstream thereof in the transport direction can again be associated with the linear portion 20. In this case, at least in the region of the printing stations, the apparatus includes support surfaces 48 as described above, by way of which vertical forces are carried by the housing 32 of the screw 24 associated with that linear portion 20. Transfer of the article carriers from the transport wheel 26 to the screw associated with the linear portion 20 takes place in the manner already described above in relation to the linear portion 18. At the downstream end of the linear portion 20 the respective article carrier is then again transferred to the transport wheel 25 with which there can be associated a further screen printing station in which for example the total print image resulting from the individual print images applied in the offset printing station can be provided with a transparent protective coating of a suitable lacquer or the like. The decorated product is then removed from the respective article carrier 12 in a station as indicated at S in FIG. 1, possibly after an operation for checking the quality of the print image produced on the respective article has firstly been implemented.

The number of article carriers which circulate on the transport path 16 in substance depends on the number of treatments to which the respective articles are to be subjected, and thus also the number of treatment stations with which the apparatus 10 is provided.

As a departure from the embodiment illustrated in FIGS. 1 through 5 the arrangement may also be such that at least one of the two transport wheels 25, 26 is rotated in a stepwise manner. In that case it may be desirable for transfer of the article carrier from the transport wheel 25 or 26 to the respective screw and vice-versa to be implemented when the article carrier is not involved in any movement along the transport path 16. That could give rise to a design configuration in which, at its end at which there is a transport wheel rotating with a stepwise movement, the respective transport screw as at 24 has a portion in terms of its screw flight, which extends at a right angle to the longitudinal axis of the screw, that is to say it does not have an inclined pitch at that location, in order thus to provide the operative connection between the article carrier and more specifically the entrainment roller 36 thereof and the screw flight 44, at the moment at which the article carrier is stopped.

Precise orientation of the articles which are to be printed upon, in relation to the printing mechanism and in particular an offset impression cylinder, presupposes that the article also adopts a properly defined position in the receiving means. In general, for that purpose in a station as indicated at P in which the articles are successively fitted to the article carriers 12, or in a following station, the article is oriented in relation to the article carrier in conventional manner by means of a suitable bar or rod which is passed for example through the central opening in each CD, and the article is thereafter held in that properly aligned position by means of vacuum by which the article is pressed against the receiving means or the holding means 15 carrying same. For that purpose, each article carrier 12 can be connected to a reduced-pressure source by way of a hose indicated at 60 in FIG. 3. The hose 60 can be provided with a feed conduit which passes around the apparatus with the article carriers 12. The length of the hose 60 is to be so selected that it can compensate for the varying spacings occurring between the article carriers, in the linear portions 18, 20 of the transport path 16, by virtue of the different speeds of movement of the article carriers as they pass along the length of the transport screw. Furthermore, a connection as indicated at 63 in FIG. 3 for compressed air can be associated with each article carrier. The connection 63 is only connected to a compressed air source in the article-removal station, so that in the removal station the reduced pressure acting on the article in the respective article carrier is thereby neutralised, accordingly to facilitate removal of the article from its receiving means 14.

Reference will now be made to FIG. 6 to describe a second embodiment of the invention in which treatment stations and devices for introducing and removing the respective articles are also diagrammatically illustrated. The FIG. 6 structure is the same in terms of all its essential parts and in regard to the arrangement thereof as the embodiment described hereinbefore with reference to FIGS. 1 through 5 so that in the following description of FIG. 6 the same references but increased in each case by 100 are also used to denote the same components.

A particularity of the embodiment shown in FIG. 6 is that, with one exception, all the handling and treatment stations are operatively associated with the linear portions 118, 120 of the transport path 116, in such a way that disposed along the linear portion 118 are four offset printing stations indicated at A–D, downstream of each of which is arranged a respective drying station E, F, G and H respectively. In this case, the drying stations E, F and G are also arranged along the linear portion 118 whereas the drying station H is disposed in the region of the arcuate portion 122 and is thus operatively associated with the transport wheel 126. The drying station H extends approximately tangentially with respect to the arcuate portion 122 of the transport path 166 in order in that way to provide a residence time which is of the greatest possible length for the article to be dried, in the region of the drying station H, while the transport wheel is continuously rotating.

Associated with the other linear portion 120 of the transport path 116 are two screen printing stations indicated at K and L, downstream of each of which, in the transport direction 146, is a respective drying station M and N also provided with at least one UV-radiating device.

Transportation of the articles to be printed to the printing machine indicated at 110 and transportation of the printed articles away from the printing machine 110 is effected by a transport means which is preferably in the form of a transport or conveyor belt 165. The articles are arranged in the form of stacks in magazines 166 provided in the usual manner with a vertical spindle 168 which represents a holding and guide pin and which extends through the central hole in all objects forming the respective stack, being here in the form of CDs. At the lower end the respective magazine 166 is defined by a plate-shaped or tray-shaped base 170 or the like. Magazines of that kind are generally conventional practice in this context.

The articles which are to be separated into individual items in a manner that is still to be described hereinafter are introduced in the station P into the respective receiving means 114 of the respective article carrier 112 disposed in that station.

To carry out the procedure for separating the articles into individual items, provided in the region of the delivery station P beside the conveyor belt 165 at the side thereof that is towards the printing machine 110 are two separating stations 174, 175 which are disposed in side-by-side relationship in the transport direction 172 and which each receive a respective magazine 166 with the stack of articles such as CDs carried thereby. Associated with the two stations 174, 175 is a common shaped portion 176 which, at its side towards the conveyor belt 165, is provided with two approximately semicircular recesses 174*a*, 175*a*, the dimensions of which are adapted to the diameter of the base tray or plate 170 of the respective magazine 166. In that way, the two magazines 166 in the stations 174, 175 are oriented in relation to an intermediate position 178 in which an identity check in respect of each CD is effected before, in the station P, the item is introduced into the receiving means 114 of the respective article carrier disposed at that location.

Associated with the two stations 174, 175 is a common transport element in the form of a suction gripper which is reciprocable between one of the two stations 174, 175 on the one hand and the intermediate position 178 on the other hand, the suction gripper being only diagrammatically indicated in FIG. 6 by the two arrows 179. The suction gripper as indicated at 179 which is a conventional item of equipment takes a respective CD, namely the uppermost CD, from a stack of CDs, in one of the two magazines 166 in the stations 174, 175, and deposits it at the intermediate station 178. After the above-mentioned identity check has been carried out for example by means of a camera and in dependence on the result thereof, the CD is removed from the intermediate station 178 by means of a second suction gripper which is indicated in FIG. 6 by the arrow 181, and deposited in the empty receiving means 114 of the respective article carrier disposed in the station P. If the CD which is now disposed in the receiving means 114 is of the correct identity, it is transported through the treatment stations arranged along the transport path 116, in the manner already described in connection with the embodiment illustrated in FIGS. 1 through 5.

If the identity check in the intermediate station 178 has given the result that this is a wrong or incorrect CD, that CD is removed from the receiving means 114 of the respective article carrier by a suction gripper in a station Q which is disposed downstream in the transport direction 146, and it is fed to a magazine 180 which is of a similar configuration to the magazines 166 and which is arranged on a base in the form of a turntable 182 carrying three further such magazines 180*a*, 180*b* and 180*c*, of which the magazine 180*a* also serves to receive articles which were rejected in the identity check and which therefore are immediately removed from the printing machine 110 again. The suction gripper which is movable between the receiving means 114 in the station Q and the magazine 180, or any one of the other magazines 180*a*, 180*b* and 180*c* in that position, is indicated by the double-headed arrow 183 which symbolically represents the reciprocating movement of that suction gripper. A double-headed arrow is used here for the reason that an article is also transported from a magazine on the turntable 182, which is in the position of the magazine 180, to the respective receiving means 114 in the station Q, in a manner still to be described hereinafter.

The presence of two magazines 166 in the respective separating positions 174 and 175 affords the advantage that, as soon as the suction gripper 179 has removed the last CD for example from the stack in the magazine disposed in the position 174, the suction gripper 179 is moved into the station 175 in the next movement into the starting position for picking up a CD, and successively picks up the CDs stacked in the magazine in the station 175, and transports same into the intermediate position 178. That change in the movement of the gripper 179 from the one position 174 to the other position 175 and vice-versa is effected without any time delay so that, after emptying of a magazine whose stack of CDs has for example 150 CDs, the operation of loading the printing machine 110 can be continued without interruption, with articles from the other magazine.

The replacement of an empty magazine 166 which is in the separating position 174 or 175 respectively, by a magazine which is filled with articles, can be effected by a procedure whereby the feed transportation movement of the magazines which are filled with articles and which are disposed in front of the two separating stations 174, 175 in the transport direction 172 is interrupted, with the transport belt 165 moving. For that purpose, there is provided an abutment 184 which is reciprocable substantially transversely with respect to the transport direction 172 and which, in its operative position as shown in FIG. 6, projects into the transport path of the magazines on the conveyor belt 165, in such a way that the first magazine 166*a* which is disposed in front of the abutment 184 in the transport direction 172 comes to bear against the abutment and is prevented from moving further along. A corresponding situation then applies in regard to all magazines disposed therebehind. Desirably in that respect the conveyor belt 165 is of such a nature that the friction between the magazines and the surface of the conveyor belt 165 which carries the magazines 166 is very slight so that the conveyor belt 165 can readily pass along beneath the stationary magazines resting thereon.

The magazines disposed downstream of the abutment 184 in the transport direction 172 are further transported by the conveyor belt 165 so that, in the region beside the two separating stations 174, 175, the conveyor belt 165 then does not have any magazine 166 and is therefore empty, and thus the empty magazine can be pushed out of the separating station 174 or 175 respectively by virtue of a suitable transverse movement on to the conveyor belt 165. When now the abutment 184 is pivoted back out of its operative position shown in FIG. 6 into an inoperative position, transversely with respect to the transport direction 172, the magazines 166 disposed in front of the abutment 184 in the transport direction 172 are entrained again, in which case the magazine which is previously displaced out of the respective separating station 174 or 175 on to the conveyor belt 165 is also transported away by the continuously moving conveyor belt 165.

Furthermore, associated with each of the two separating stations 174 and 175 is an abutment 186 and 187 which, similarly to the abutment 184, is reciprocable between an operative and an inoperative position. After the empty magazine which had been previously pushed out of the station 174 on to the conveyor belt 165 has been transported away by the belt 165 and before the abutment 184 is displaced into its inoperative position, the abutment 186 is moved into its operative position, that is to say into the region of movement of the magazines 166 on the conveyor belt 165, with the result that, after the abutment 184 is moved away, the magazine 166*a* which leads in the transport direction 172 and which is filled with articles to be printed upon comes to bear against the abutment 186 and is prevented thereby from being further entrained by the conveyor belt 165. The magazine 166*a* which is now disposed in front of the abutment 186 can now be displaced into the station 174 transversely with respect to the transport direction 172, alignment in relation to the transfer suction gripper 179 being effected in the manner already described above by means of the shaped portion 176 or the wall of the recess 174*a* afforded thereby.

Exchange of the magazines in the separating station 175 is effected in a similar fashion, for which purpose the abutment 187 would have to be moved into its operative position. The means which provide for transverse displacement of the magazines from the conveyor belt 165 into the respective station 174 or 175 and in the opposite direction are not illustrated in FIG. 6. Reference numeral 188 denotes two vertically displaceable support elements by which the stack of CDs in the magazine are lifted to the level at which the respective uppermost CD is disposed in the region of the suction gripper 179.

Before the printed articles are removed in the removal station S from the respective receiving means 114 which is then positioned in that station S, the articles pass through the station R in which the print image is monitored and checked for example by a camera. Associated with the removal station S is a turntable 189 which is also provided with four magazines 190, 190a, 190b and 190c for articles. A suction gripper which is indicated by arrow 191 is reciprocable between the receiving means 114 respectively disposed in the removal station S, and the magazine 190, or another magazine on the turntable 189 which is in that intermediate position. Associated with the spindles of the magazines 190, 190a is an intermediate storage unit (not shown) comprising for example a component which is designed in the manner of a tongs assembly and which embraces the associated spindle, the two parts of the tongs assembly being movable between a closed position in which they form the intermediate storage unit for the CD respectively removed in the removal station S, and an open position in which there is, between the two parts of the tongs assembly, an opening which is larger than the CD so that it falls downwardly through the intermediate storage unit. The position adopted by the intermediate storage unit is determined by the result of the operation of checking the print image in the station R. If the print image does not comply with the quality requirements in regard thereto, the intermediate storage unit is moved into the open condition so that the CD falls down through the parts of the intermediate storage unit and initially remains there until a correspondingly large stack of CDs whose print image was rejected as being of inadequate quality in the station R has accumulated. In the other situation, that is to say when the print image is judged to be of adequate quality, the tongs assembly representing the intermediate storage unit remains in the closed condition so that the CD is deposited thereon, and it is then removed therefrom by a suction gripper in the course of a following working cycle in order to be moved into one of two collecting stations 192 and 193 respectively and there put on to and stacked on the spindle of the magazine in the respective collecting station 192, 193. That arrangement corresponds to that of the two separating stations 174, 175 so that the suction gripper indicated by the arrows 194 is movable between the magazines 190 and 190a respectively on the turntable 189 and a respective one of the two collecting stations 192, 193. As the presence of two separating stations 174, 175 makes it possible to provide for an uninterrupted feed of articles to the printing machine 110, there is accordingly also a need to provide two collecting stations 192, 193 in order to be able to take up the printed articles in an uninterrupted succession.

The operation of stacking the printed CDs in the collecting stations 192, 193 is implemented by using the magazines 166 which had been previously emptied in the stations 174, 175. After the empty magazine has been returned from the station 174 or 175 respectively on to the conveyor belt 165 in the manner already described hereinbefore, it is further transported in the direction of the arrow 172 until it passes into a position in which it is disposed in opposite relationship to the respective collecting station 192 or 193 respectively. In that respect once again operatively associated with each of the two collecting stations is a respective abutment 195 and 196 which, similarly to the abutments 184, 185 and 186, are each displaceable between an operative and an inoperative position.

In the course of a transverse movement the filled magazine is moved out of the collecting station 192 or 193 respectively on to the belt 165, in which case transportation of the magazines disposed upstream of the respective station 192 or 193 in the transport direction 172 is interrupted by the abutment 198 coming into operation. Conversely, for introducing an empty magazine into one of the stations 192 or 193 the respective abutment 195 or 196 is moved into its operative position so that a magazine which has been emptied in one of the stations 174 or 175 is moved into a position in front of the respective abutment 195 or 196 respectively and is thereafter displaced by a suitable movement transversely to the transport direction 172 into the station 192 or 193 respectively.

The other two magazines 180b, 180c of the first turntable 182 serve to receive articles which represent dummy articles and which are only used for those operating phases of the machine in which it is starting up, until the desired print quality has been set, or in which some tests are being carried out for which no original articles which can be expensive need to be used. The transfer of dummy articles from one of the magazines 180b, 180c to the printing machine is effected by the above-mentioned suction gripper 183, with the dummy articles being introduced into the respective article carrier 112 which is positioned in the station Q. Those dummy articles are removed from the apparatus by the suction gripper 191 at the removal station S. It will be noted that the turntable 189 is then in a position in which one of the magazines 190b, 190c which serve exclusively to receive dummy articles is disposed in the position which is adopted by the magazine 190 in FIG. 6. In that respect, the individual functions of the overall machine, that is to say including the device for feeding and removing the articles or dummy articles respectively, are interlinked in terms of control procedure in such a way that in any case, when feeding dummy articles from one of the magazines 180b, 180c of the turntable 182 which are equipped therewith, those dummy articles are automatically stacked only in those magazines 190b, 190c of the turntable 189, which are intended for those dummy articles. This prevents dummy articles unintentionally passing into the transport flow of the 'genuine' articles.

The presence of respective pairs of magazines 180, 180a, 180b, 180c and 190, 190a; 190b, 190c on the turntables 182 and 189 respectively also serves the purpose of preventing interruptions in operation of the printing machine by virtue of the replacement of empty or full magazines.

It will be noted that in the treatment or handling stations in which movement of the respective article carriers is not desirable or possible, the screw for transporting the article carriers can be of such a nature that a portion of the screw flight extends in a plane perpendicularly to the longitudinal axis of the screw so that in spite of the rotary movement of the screw, for a given period of time, the article carrier is not displaced along the transport path. That can be the case for example at the screen printing stations and/or stations in which the articles are introduced into or removed from the respective article carriers.

It will be appreciated that the above-described apparatuses and methods of decorating articles in accordance with the invention have been set forth solely by way of example and illustration of the principles thereof and that various other modifications and alterations may be made therein without thereby departing from the spirit and scope of the invention.

What is claimed is:

1. Apparatus for decorating articles comprising means providing a transport path having an extent over at least a portion of which it is linear, a treatment station disposed along said transport path for applying decoration to articles, article carriers for carrying respective articles movable along said transport path, and transport means for transporting the article carriers along the transport path, the transport means including at least one screw operatively associated with said at least one linear portion of the transport path such that rotation of the screw transports article carriers linearly along the transport path, the screw having at least one screw flight adapted to engage said article carriers movable along said linear portion of said transport path screw, the article carriers being engaged to the flight of the screw at an engagement point such that the article carriers are restrained from motion relative to the engagement point between an article carrier and the flight of the screw, and means for driving said screw in rotation, the at least one screw flight having a varying pitch along the longitudinal extent of the screw.

2. Apparatus as set forth in claim 1 including means for at least temporarily driving the screw in rotation at a constant speed.

3. Apparatus as set forth in claim 1 wherein the screw flight has at least one portion at which the screw ceases forward transportation movement of the article carrier thereat while the screw continues to rotate.

4. Apparatus as set forth in claim 1 wherein the screw flight is of varying width along the extent of the screw.

5. Apparatus as set forth in claim 1 wherein each article carrier has a projection and the screw flight of the screw is adapted to engage the projection of the respective article carrier.

6. Apparatus as set forth in claim 5 wherein each article carrier has an opening therein and the screw flight is adapted to engage into the opening in the respective article carrier.

7. Apparatus as set forth in claim 6 wherein the opening in the respective article carrier is formed by at least first and second rotary members disposed at a spacing from each other, the spacing matching the configuration of the screw flight.

8. Apparatus as set forth in claim 7 wherein at least said rotary body adapted to be urged by the forward drive force of the screw for producing the transport movement of the respective article carrier along said transport path is of a crowned configuration in longitudinal section of said rotary body.

9. Apparatus as set forth in claim 6 wherein the opening in the respective article carrier is formed by at least first and second rotary bodies disposed at a spacing from each other, the spacing thereof matching the width of the screw flight.

10. Apparatus as set forth in claim 9 wherein at least said rotary body adapted to be urged by the forward drive force of the screw for producing the transport movement of the respective article carrier along said transport path is of a crowned configuration in longitudinal section of said rotary body.

11. Apparatus as set forth in claim 1 and further including at least one guide means for the article carriers, the guide means extending along the transport path at least in the region of the at least one screw.

12. Apparatus as set forth in claim 11 wherein the guide means includes first and second guide rails of a substantially V-shaped cross-section and disposed at a substantially horizontal spacing from each other, and wherein each article carrier has at least one guide roller adapted to co-operate with each of the respective guide rails, the guide roller having a peripheral surface of a cross-sectional configuration corresponding to that of the rails.

13. Apparatus as set forth in claim 12 and further including at least one support surface at least in a portion of said transport path associated with said at least one screw, wherein said article carrier has support roller means adapted to rollingly co-operate with said support surface to support the respective article carrier.

14. Apparatus as set forth in claim 13 wherein said support surface is disposed on at least one said guide rail.

15. Apparatus as set forth in claim 13 wherein the support rollers of each article carrier are arranged outside the periphery of the surface of the article which is to be decorated.

16. Apparatus as set forth in claim 11 wherein said guide means extends over the entire length of the transport path.

17. Apparatus as set forth in claim 1 and further including at least first and second linear transport path portions which are arranged at a spacing from each other substantially in a horizontal plane, and first and second arcuate transport path portions interconnecting said first and second linear transport path portions to form a closed loop configuration, wherein a said screw is operatively associated with at least one of said first and second linear transport path portions.

18. Apparatus as set forth in claim 17 and further including a respective transport wheel operatively associated with each of said arcuate transport path portions, wherein each article carrier includes means for connecting the respective article carrier and the respective transport wheel to provide for transport movement of the article carrier at each of said arcuate transport path portions.

19. Apparatus as set forth in claim 18 wherein each said article carrier has first connection means for making a driving connection between the article carrier and a respective said transport wheel and second connection means for making a respective driving connection between said screw and the respective article carrier, the arrangement being such that at a transition between a linear transport path portion and an arcuate transport path portion the driving connection between the article carrier and the transport means changes between said first and second connection means.

20. Apparatus as set forth in claim 19 and including means for adjusting the peripheral speed of a transport wheel to be at least approximately coincident with the linear speed imparted to a respective article carrier by said screw at a transition between said screw and a said transport wheel.

21. Apparatus as set forth in claim 18 wherein the first and second transport wheels are of the same diameter and the first and second linear transport path portions extend in mutually parallel relationship.

22. Apparatus as set forth in claim 18 wherein the first and second transport wheels are of different diameters.

23. Apparatus as set forth in claim 18 and including means for driving at least one of said first and second transport wheels continuously in rotation.

24. Apparatus as set forth in claim 18 including means for discontinuously driving at least one of the first and second transport wheels in rotation.

25. Apparatus as set forth in claim 17 and further including a plurality of printing stations which are all disposed along the linear transport path portions.

26. Apparatus as set forth in claim 25 wherein at least some of said printing stations are offset printing stations and the offset printing stations are all disposed along the same linear transport path portion.

27. Apparatus as set forth in claim 1 and further including an intake station at which articles to be decorated are fitted into respective ones of the article carriers, at least first and second magazines for the articles to be decorated, the magazines being disposed in a separating position and being operatively associated with the intake station, a common transport element operatively associated with the first and second magazines and adapted to take articles individually from a respective one of the magazines and transport the articles towards the intake station, wherein the magazines are replaceable alternately after at least partial emptying thereof with filled magazines, a removal station at which decorated articles are removed from the respective article carriers, at least first and second magazines for collecting the decorated articles, operatively associated with the removal station, a common transportation element associated with the first and second magazines at the removal station for transportation of the decorated articles to one of the first and second magazines, wherein the first and second magazines at the removal station are alternately replaceable by at least partially empty magazines.

28. Apparatus as set forth in claim 27 and further including a checking position comprising a means for identifying wrong or incorrect articles, between the magazines at the separating station and the intake station, a further transport element between said checking position and the intake station, and a second removal station downstream of said intake station in the direction of transport movement of said articles, said second removal station removing articles identified as wrong or incorrect from the respective article carrier.

29. Apparatus as set forth in claim 28 and further including at least one magazine intended exclusively for articles identified as wrong or incorrect, operatively associated with said second removal station at which articles identified as wrong or incorrect are removed from the respective article carrier, and a transport element for transporting an article identified as wrong or incorrect between said second removal station and said magazine operatively associated with said second removal station.

30. Apparatus as set forth in claim 29 including a base means carrying said magazine for receiving articles identified as wrong or incorrect, and at least one further magazine carried on said base means, and means for displacing the base means to cause the at least two magazines thereon to be moved alternately into a position for co-operation with said transport element.

31. Apparatus as set forth in claim 30 wherein at least one additional magazine carried on said base means is for receiving dummy articles which may be substituted for genuine articles during operation of the apparatus, and a transport element between the at least one additional magazine carried on said base means and a station for receiving said dummy articles, said transport element for moving the dummy articles from the at least one additional magazine carried on said base means and onto an article carrier.

32. Apparatus as set forth in claim 27 and further including an intermediate position between said removal station for decorated articles and said at least first and second magazines in the collecting station, a first transportation means for depositing decorated articles in said intermediate position, a base means on which said intermediate position is disposed and which carries at least first and second magazines of which at least one is for receiving dummy articles and at least one is for receiving genuine articles, means for displacing the base means to cause the at least one magazine for the genuine articles and the at least one magazine for the dummy articles to be moved alternately into a position at which said first transportation means can deposit a decorated article in a magazine, and means for controlling the position of the base means at the intermediate position so that when the article carriers are carrying dummy articles, at least one magazine for the dummy articles is at a position at which said first transportation means can deposit a decorated article in said magazine.

33. A method of decorating articles comprising the process of transporting the articles along a transport path having an extent over at least a portion of which the transport path is linear, and decorating the articles at at least one article-treatment station disposed along the transport path, wherein the articles are each carried by a respective article carrier, the drive for the article carriers to move them along said linear portion of the transport path is effected by at least one screw associated with said linear portion of the transport path, the screw having at least one screw flight operatively associated with a respective article carrier on said linear portion of said transport path in such a way that rotation of said screw transports the respective article carrier along the linear portion of said transport path;

the speed of the article carriers moving along said linear portion of said transport path being controlled by a varied configuration of the screw flight on the screw; and the article carriers being engaged to the flight of the screw at an engagement point such that the article carriers are restrained from motion relative to the engagement point between an article carrier and the flight of the screw.

34. A method as set forth in claim 33 wherein the screw rotates at least temporarily at a constant speed.

35. A method as set forth in claim 33 wherein in the region of at least one portion of the screw the article carriers are controlled to be substantially stationary by a portion of said screw flight which is of such a configuration that no forward transport movement of the respective article carrier engaged therewith occurs when the screw is rotating.

36. A method as set forth in claim 33 further comprising transferring articles from a first or second supply magazine to an article carrier, wherein first and second supply magazines for articles to be decorated are operatively associated with an intake station in which articles to be decorated are respectively fitted into an article carrier movable along said transport path and replacement of an empty magazine by a filled magazine occurs while articles are being removed from the respective other magazine; and transferring articles from the article carriers to a first or second output magazine, wherein first and second output magazines are operatively associated with a removal station at which printed articles are removed from respective article carriers, said first and second magazines being alternately filled with the articles in such a fashion that when a filled magazine is being replaced by an empty magazine the respective other magazine is filled with decorated articles.

37. A method as set forth in claim 33 further comprising an identity checking step wherein after removal from the magazine in a separating position articles are subjected to an identity checking operation and then in the intake station fitted into the respective article carrier in said intake station and in the event of an article being found to be of the wrong identity removed again from the article carrier in a station disposed downstream of said intake station in the transport direction, at the latest before said article carrier carrying the wrong article reaches the first decoration station.

* * * * *

(12) REEXAMINATION CERTIFICATE (4739th)
United States Patent
Hellmeier et al.

(10) Number: US 6,082,256 C1
(45) Certificate Issued: Feb. 18, 2003

(54) APPARATUS AND METHOD OF DECORATING ARTICLES USING A TRANSPORT SCREW WITH A VARYING SCREW FLIGHT PITCH

(75) Inventors: Joachim Hellmeier, Rödinghausen (DE); Volker Steffen, Herford (DE)

(73) Assignee: Werner Kammann Maschinenfabrik GmbH, Bunde (DE)

Reexamination Request:
No. 90/006,220, Feb. 15, 2002

Reexamination Certificate for:
Patent No.: 6,082,256
Issued: Jul. 4, 2000
Appl. No.: 09/153,400
Filed: Sep. 15, 1998

(30) Foreign Application Priority Data

Oct. 14, 1997 (DE) .......................... 197 45 313

(51) Int. Cl.⁷ .............................. B65G 33/02
(52) U.S. Cl. ..................... 101/35; 101/44; 198/792; 198/867.14; 198/867.15
(58) Field of Search .................... 101/35, 36, 37, 101/38, 39, 40, 43, 44; 198/334, 465.1, 465.2, 467.1, 792, 867.01, 867.14, 867.15

(56) References Cited

U.S. PATENT DOCUMENTS

| | | |
|---|---|---|
| 3,035,515 A | 5/1962 | McKay |
| 3,264,979 A | 8/1966 | Price, Jr. |
| 4,787,310 A | 11/1988 | Tiemann |
| 5,456,169 A | 10/1995 | Rohwetter et al. |
| 5,865,114 A | 2/1999 | Averill et al. |
| 6,000,901 A * | 12/1999 | Fierkens ................. 414/416.09 |
| 6,082,256 A | 7/2000 | Hellmeier et al. |

FOREIGN PATENT DOCUMENTS

| | | |
|---|---|---|
| DE | 32 24 330 | 1/1984 |
| EP | 0 695 634 | 2/1996 |
| EP | 0 581 378 | 10/1996 |
| GB | 1 218 983 | 1/1971 |

\* cited by examiner

*Primary Examiner*—Ren L Yan

(57) ABSTRACT

In an apparatus and method of decorating articles which are transported on article carriers through a treatment station along a transport path which is linear at least over a portion of its extent, the article carriers are transported through the linear portion of the transport path by a screw having a screw flight adapted to engage with a respective article carrier required to move along the linear portion of the transport path. Rotation of the screw advances the respective article carrier along the linear transport path portion. The screw preferably rotates at a constant speed so that changes in the speed of movement of the article carrier along the linear portion of the transport path are implemented by variations in the screw flight pitch over the length of the screw.

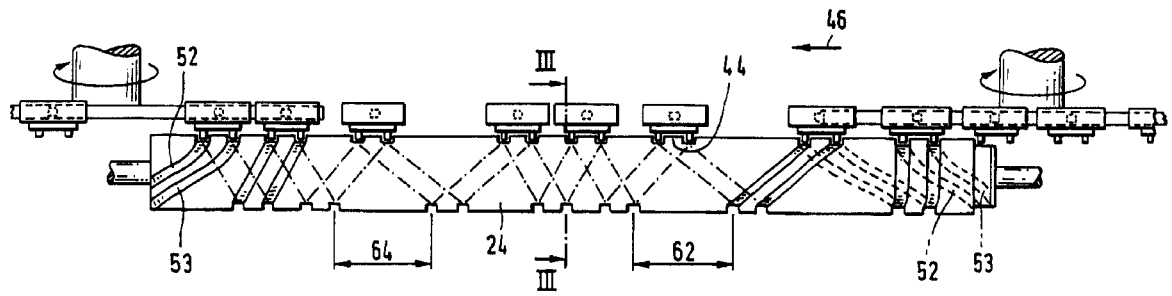

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–37 is confirmed.

\* \* \* \* \*